United States Patent Office 3,208,980
Patented Sept. 28, 1965

3,208,980
POLYMER COMPOSITIONS USING LIQUID CARBOXY-TERMINATED DIENE POLYMER AND EPOXIDIZED COMPOUND
Jerry T. Gruver and Gerard Kraus, Bartlesville, Okla., assignors to Phillips Petroleum Company, a corporation of Delaware
No Drawing. Filed Dec. 30, 1960, Ser. No. 79,558
9 Claims. (Cl. 260—78.4)

This invention relates to a novel composition. It also relates to a method of making a novel composition.

In one of its aspects, the invention relates to a composition obtained by heating a mixture of a carboxy-terminated polymer of a conjugated diene and a polyepoxide compound containing at least 3 epoxide groups. It also relates to a method for the preparation of compositions, ranging from rubbers to hard plastics, which comprises commingling a liquid carboxy-terminated polymer of a conjugated diene with a polyepoxide compound containing at least 3 epoxy groups and heating the mixture thus obtained.

We have now discovered that, by heating a commingled liquid carboxy-terminated polymer of a conjugated diene and a polyepoxide compound, as described herein, containing at least 3 epoxide groups, there are obtained compositions which are useful as are rubbers, rigid plastics and compositions having properties partaking of rubbers and plastics which can be said to lie in a range defined by rubbers, on the one end, and rigid plastics, on the other end.

Carboxy-terminated polymers of conjugated dienes range from free flowing liquids to rubbery products. This invention is related to using the liquid polymers or products. These materials can be vulcanized using conventional rubber compounding recipes by which means vulcanizates are cross-linked through the points of unsaturation in a manner similar to that occurring with conventional rubbery polymers. When so operating, crosslinking occurs intermediate to the ends of the polymer chains, leaving an appreciable portion of the molecule not bound in the crosslinked network. They can also be treated with difunctional reagents such as glycols, dihaloalkanes, diepoxy compounds such as the epoxy resins and the like, by which means they are coupled to provide longer polymer chains having increased molecular weight, but a true cure is not realized.

The mass consisting essentially of the liquid carboxy-terminated polymer of a conjugated diene and a material containing at least three epoxy groups, according to the invention, upon heating will crosslink to provide a firm but resilient mass having excellent properties, as evident herein.

It is an object of this invention to provide a novel polymer composition. It is another object of this invention to provide a method for producing a novel polymer composition. It is a further object of this invention to produce polymer compositions ranging from rubbers to hard plastics. It is another object of this invention to convert a liquid carboxy-terminated polymer of a conjugated diene into a material having properties exhibited by rubbers, hard plastics, and products having properties intermediate rubbers and hard plastics. It is a still further object of the invention to provide a crosslinked polymer mass having the characteristic of being firm, yet resilient.

Other aspects, objects, and the several advantages of the invention will be apparent from a study of the disclosure and the appended claims.

According to the present invention, a novel polymer product is provided by commingling or admixing a carboxy-terminated polymer of a conjugated diene with a polyepoxide compound containing at least three epoxide groups and heating the resulting mixture. The carboxy-terminated polymers used are liquid.

The particular liquid carboxy-terminated polydienes used in this invention can be prepared by any suitable means. One procedure for such synthesis involves solution polymerization of the diene in the presence of an alkali metal catalyst and treatment of the resulting polymer with carbon dioxide. The catalysts employed include the group consisting of an alkali metal, an alkali metal hydride, and an organo compound of an alkali metal. Presently preferred are lithium catalysts, still more preferred being dilithium organic compounds such as dilithiobutane, dilithium stilbene, dilithium naphthalene, and the like. By employing the dilithium organic compounds, the polymer molecules obtained are terminated at each end by a lithium atom. By treatment with carbon dioxide, these lithium atoms are replaced by carboxy groups, present as lithium salts. As a final step, the product is treated with an acid in order to convert the lithium salt to the free acid form. The carboxy terminated polymers used in the invention are those materials which are liquid and which can be represented by the general formula

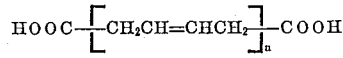

in which $n$ is a number between 10 and 300.

Carboxy terminated liquid copolymers of a conjugated diene with a vinyl monomer can also be used in this invention. Suitable vinyl monomers include styrene, methyl acrylate, methyl methacrylate, vinyl chloride, acrylonitrile, and the like, the amount of comonomer present usually being less than 50 parts, preferably less than 25 parts per hundred parts of monomer. In all cases, the monomer ratio and/or the polymerization procedure is adjusted to provide liquid products.

The polyepoxy compounds employed will contain at least three oxirane groups

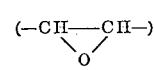

these groups being units in an open chain hydrocarbon chain or as branches therefrom. The percent epoxy oxygen will usually exceed 0.5 percent and will preferably be in the range from 2 to 12 percent or higher. Typical of such compounds are Triepoxyhexane
Triepoxydecane
2,3,6,7,11,12-triepoxydodecane
2,3,5,6,-diepoxy-9-epoxyethyldodecane
Pentaepoxyeicosane
2,3,5-triepoxyethyl-9,10-epoxyhexadecane and the like. A particularly useful compound of this class is a liquid epoxidized polybutadiene containing 3 or more epoxy groups per molecule, these materials comprising a preferred species of the present invention. These materials can be prepared by treatment of a liquid polymer of butadiene with a peracid such as performic or peracetic acid. They contain a multiplicity of epoxy groups situated in the polymer chain and/or in the side chains present therein. Hydroxyl groups and/or ester groups can be present in the molecule without adverse effect on the compositions prepared.

Although it is known to obtain products through the epoxide derivatives of unsaturated hydrocarbon polymers by reaction with a carboxylic acid to obtain oil derivatives and also to react a rubbery copolymer or elastomer containing a reactive carboxyl group with an epoxy compound, it is believed entirely unexpected that the particular liquid polymers used in the present invention, as used, will produce the products which have been obtained. The products of the present invention have a three-dimensional structure which is distinguishable from the structure obtained upon the coupling of a carboxy-terminated polymer and a diepoxy compound.

As stated, the carboxy-terminated polymers used are liquid materials. The carboxy-terminated polymer can be mixed with the liquid epoxy compound by simple stirring to provide a liquid blend which can be poured into a mold, spread in sheets, or incorporated as a component of a laminate or the like. Upon heating, the mass crosslinks to provide a firm but resilient mass having excellent properties.

Usually, when adding from 1 to 10 equivalents of the epoxy compound (based on equivalents of the epoxy groups present) per carboxy group equivalent present in the carboxy-terminated polymer, masses obtained according to the present invention can be cured to rubbery solids. By using larger amounts, generally from 11 to 1000, preferably from 40 to 500 equivalents, of the epoxy compound per carboxyl group equivalent hard resins can be obtained. In the latter embodiment, it is necessary to include in the mixture a curing agent for the excess epoxy compound, such as maleic anhydride, phenylenediamine, triethylenetetramine, and the like. A small amount of a phenolic material such as phenol, resorcinol, or the like is frequently desirable when using an amine in the system and glycols are often added when using a moleic anhydride system. These secondary curatives are usually preferred when operating with from 50 to 100 or more equivalents of epoxy compound per equivalent of carboxy groups present in the polymer. Such systems are conventional for curing of epoxy resins.

When long chain liquid carboxy-terminated molecules are used containing a multiplicity of unsaturated linkages, it is generally preferred to include in the compounding recipe a conventional compounding system. By so operating the vulcanization reaction or crosslinking of the polymer, there is involved a (1) crosslinking effected by reaction between the epoxy groups of the epoxy compound and the terminal groups of the carboxy-terminated polymers and (2) crosslinking through the unsaturated linkages of the polymer. When the preferred epoxy-polybutadienes of the invention are employed, unsaturated linkages in the epoxidized polymer also enter into the latter reaction. It is frequently desirable to include in the receipe a polyamine such as disclosed above. By so operating, residual epoxy groups are crosslinked by reaction with the amine. The amount of epoxy compound employed will generally be in the range between about 1 and 10 equivalents of epoxy compound per equivalent of carboxy group in the carboxy-terminated polymer. Conventional compounding systems includes sulfur systems and peroxide activated systems.

The heating or curing step of the invention will generally be effected at a temperature in the range between 100 and 500° F., preferably from 200 to 400° F., for from 10 minutes to 100 hours, preferably from 0.5 to 50 hours. One skilled in the art in possession of this disclosure can readily determine by routine test the desirable conditions, which in a given case may be even outside the recited ranges, which will yield a product contemplated to be produced by the present invention.

Products from the process of the invention are useful in a variety of applications. Particularly significant is the finding of the applicability of the liquid mixtures of liquid carboxy-terminated polybutadienes with liquid epoxy compounds in plastisol-type molding operations. These liquid blends have a long pot life at ambient temperatures but can be set up to solid products by a relatively short heating period. They are thus applicable for use as potting compounds in the fabrication of electrical goods, the manufacture of toys, gaskets, household items and the like. Molding can be effected readily without the need for expensive extrusion of injection molding equipment. They can be employed for the production of foamed articles by incorporation therein of chemical blowing agents. Articles fabricated from these materials have outstandingly good low temperature properties, rendering them useful as gaskets in refrigeration systems, for goods employed in high altitude flight and in arctic or subarctic regions.

The resinous materials prepared by blending a large proportion of epoxy compound with a small amount of liquid carboxy-terminated polymer are modified in hardness, thus improving their properties for numerous applications. Being generally thermosetting, they are useful in applications in heated environments when many thermoplastics cannot be used.

In any or all of the foregoing embodiments, pigment or fillers can be incorporated in the mixtures prior to the heating step as may be desired for the particular use for which they are designed.

EXAMPLE I

A liquid carboxy-terminated polybutadiene having a carboxy content of 1.66 percent by weight was prepared in the presence of dilithium stilbene, carboxylating with carbon dioxide and treating with acid. Molecular weight of this polymer was about 5400. A series of tests was made in which portions of this polymer were mixed with a liquid epoxidized polybutadiene (Oxiron 2000) by stirring. These mixture were poured into molds and cured by heating to provide slabs from which test specimens were cut for evaluation. Data on these tests are shown in Table I, col. 5.

The liquid polyepoxidized polybutadiene used in this example is a pale amber liquid having a viscosity of 1,800 poises at 25° C., a specific gravity of 1.010, and an aliphatic hydrocarbon chain as a backbone on which are attached a multiplicity (three or more) epoxy groups, epoxy content being 9.0 percent.

The epoxy content of the epoxidized material used in these examples was 9 percent.

The data presented show the effects of variation in the amount of epoxy polybutadiene, in curing temperature and in curing time. The excellent low temperature properties are also demonstrated.

EXAMPLE II

A series of tests was made in which a predominant amount of epoxidized polybutadiene (Oxiron 2000) was commingled was a small amount of liquid carboxy-terminated polybutadiene. In these tests, a secondary curing system was included in the mixture to complete the cure of the epoxy compound not reacted with the terminal carboxy groups of the carboxy-terminated polybutadiene. The products were compression molded into test specimens and evaluated to provide the data presented in Table II, col. 6.

By these data, it is demonstrated that the hardness of the resin from the epoxy compound is reduced and the electrical properties are substantially unchanged by incorporation therein of small amounts of liquid carboxy-terminated polybutadiene.

The carboxy terminated polymer used in this example had a molecular weight of about 8,500 and was prepared using a dilithium stilbene initiator as described in Example I.

*Table I*

| Polybutadiene [a] | | | Oxiron [b] | | | Ratio | Time (hr.) | Temp. (°F.) | $V_r$ | Tests at 80° F. | | | | | Tests at −90° F. | | | |
|---|---|---|---|---|---|---|---|---|---|---|---|---|---|---|---|---|---|---|
| Parts | Equiv. | | Phr. | Equiv. | | | | | | 100% Mod. (p.s.i.) | Tensile (p.s.i.) | Elong. (percent) | Shore Hardness | Rebound (percent) | 100% Mod. (p.s.i.) | 300% Mod. (p.s.i.) | Tensile (p.s.i.) | Elong. (percent) |
| 100 | 0.037 | | 10 | 0.0565 | | 1.53 | 16 | 307 | 0.315 | 90 | 150 | 200 | ------ | ------ | 810 | 1,380 | 4,530 | 770 |
| 100 | 0.037 | | 15 | 0.0848 | | 2.29 | 15 | 307 | 0.357 | 140 | 210 | 180 | ------ | ------ | ------ | ------ | ------ | ------ |
| 100 | 0.037 | | 30 | 0.1696 | | 4.58 | 15 | 307 | 0.405 | 150 | 175 | 120 | ------ | ------ | ------ | ------ | ------ | ------ |
| 100 | 0.037 | | 30 | 0.1696 | | 4.58 | 15 | 250 | 0.208 | 70 | 130 | 230 | ------ | ------ | ------ | ------ | ------ | ------ |
| 100 | 0.037 | | 30 | 0.1696 | | 4.58 | 15 | 250 | 0.265 | 40 | 160 | 450 | ------ | ------ | ------ | ------ | ------ | ------ |
| 100 | 0.037 | | 15 | 0.0848 | | 2.29 | 15 | 200 | 0.220 | 10 | 25 | 410 | ------ | ------ | ------ | ------ | ------ | ------ |
| 100 | 0.037 | | 30 | 0.1696 | | 4.58 | 15 | 200 | 0.198 | 10 | 75 | 460 | ------ | ------ | ------ | ------ | ------ | ------ |
| 100 | 0.037 | | 10 | 0.0565 | | 1.53 | 0.5 | 360 | 0.224 | 20 | 50 | 630 | 24 | 41 | 570 | 1,040 | 3,360 | 780 |
| 100 | 0.037 | | 10 | 0.0565 | | 1.53 | 1.0 | 360 | 0.279 | 60 | 90 | 310 | 33 | 53 | 710 | 1,240 | 3,690 | 750 |
| 100 | 0.037 | | 15 | 0.0848 | | 2.29 | 0.5 | 360 | 0.314 | 80 | 130 | 170 | 39 | 60 | 890 | 1,420 | 4,370 | 790 |
| 100 | 0.037 | | 15 | 0.0848 | | 2.29 | 1.0 | 360 | 0.244 | 80 | 70 | 190 | 35 | 61 | 710 | 1,300 | 3,640 | 730 |
| 100 | 0.037 | | 15 | 0.0848 | | 2.29 | 2.0 | 360 | 0.312 | 80 | 160 | 350 | 43 | 71 | ------ | ------ | ------ | ------ |
| 100 | 0.037 | | 30 | 0.1696 | | 4.58 | 0.5 | 360 | 0.314 | 100 | 170 | 240 | 52 | 78 | 1,030 | 1,650 | 5,590 | 780 |
| 100 | 0.037 | | 30 | 0.1696 | | 4.58 | 1.0 | 360 | 0.257 | 30 | 110 | 420 | 38 | 58 | 1,370 | 2,020 | 3,700 | 610 |
| 100 | 0.037 | | 30 | 0.1696 | | 4.58 | 2.0 | 360 | 0.351 | 95 | 150 | 180 | 52 | 72 | 2,250 | 2,030 | 5,800 | 570 |
| 100 | 0.037 | | 30 | 0.1696 | | 4.58 | 2.0 | 360 | 0.430 | 160 | 190 | 120 | 62 | 79 | 2,730 | 3,940 | 6,160 | 440 |

[a] Carboxy-terminated liquid polybutadiene. [b] Oxiron 2000.

*Table II*

| Polybutadiene [a] | | Oxiron 2000 [b] | | Ratio | Maleic Anhydride (Parts) | 1,3-Propanediol (Parts) | Tetraethylene Pentamine (Parts) | Resorcinol (Parts) | Cure Temp. (C.) | | Cure Time (hr.) | | 100% Mod. (p.s.i.) | Tensile (p.s.i.) | Elong. (percent) | Shore D Hardness | Dissipation Factor | K |
|---|---|---|---|---|---|---|---|---|---|---|---|---|---|---|---|---|---|---|
| Parts | Equiv. | Parts | Equiv. | | | | | | Cure | Post-cure | Cure | Post-cure | | | | | | |
| 0 | 0 | 100 | .565 | ------ | 31 | 8 | ------ | ------ | 70 | 145 | 3 | 15 | ------ | ------ | ------ | 81 | .0014 | 2.81 |
| 10 | .00258 | 100 | .565 | 218.0 | 31 | 8 | ------ | ------ | 70 | 145 | 3 | 15 | ------ | ------ | ------ | 78 | .0015 | 2.94 |
| 30 | .00774 | 100 | .565 | 73.0 | 31 | 8 | ------ | ------ | 70 | 145 | 3 | 15 | ------ | ------ | ------ | 72 | .0018 | 2.92 |
| 50 | .0129 | 100 | .565 | 43.7 | 31 | 8 | ------ | ------ | 70 | 145 | 3 | 15 | ------ | ------ | ------ | 72 | .0062 | 2.80 |
| 0 | 0 | 100 | .565 | ------ | 31 | 10 | ------ | ------ | 130 | 145 | 2 | 15 | ------ | ------ | ------ | 85 | ------ | ------ |
| 25 | .00645 | 100 | .565 | 89 | 31 | 10 | ------ | ------ | 130 | 145 | 2 | 15 | ------ | ------ | ------ | 75 | ------ | ------ |
| 50 | .01290 | 100 | .565 | 44 | 31 | ------ | ------ | ------ | 130 | 145 | 2 | 15 | ------ | ------ | ------ | 65 | ------ | ------ |
| 0 | 0 | 100 | .565 | ------ | ------ | ------ | 24 | 2 | 70 | 145 | 3 | 15 | ------ | ------ | ------ | 80 | .0031 | 2.95 |
| 10 | .00258 | 100 | .565 | 218.0 | ------ | ------ | 24 | 2 | 70 | 145 | 3 | 15 | ------ | ------ | ------ | 74 | .0038 | 2.87 |
| 30 | .00774 | 100 | .565 | 73.0 | ------ | ------ | 24 | 2 | 70 | 145 | 3 | 15 | ------ | ------ | ------ | 64 | .0022 | 2.99 |
| 50 | .0129 | 100 | .565 | 43.7 | ------ | ------ | 24 | ------ | 70 | 145 | 3 | 15 | ------ | ------ | ------ | 58 | .0052 | 2.72 |
| [c] 100 | .037 | 40 | .226 | 6 | 1 | ------ | ------ | ------ | 232 | ------ | 2 | ------ | 160 | 225 | 140 | ------ | ------ | ------ |
| [c] 100 | .037 | 40 | .226 | 6 | 1 | ------ | ------ | ------ | 171 | ------ | 16 | ------ | 175 | 275 | 150 | ------ | ------ | ------ |

[a] Carboxy-terminated polybutadiene (1.16% carboxyl). [b] Epoxidized polybutadiene (Food Machinery and Chemical Corporation's (Oxiron 2000) Product). [c] Carboxy-terminated polybutadiene (1.66% carboxyl).

Reasonable variation and modification are possible within the scope of the foregoing disclosure and the appended claims to the invention the essence of which is that liquid carboxy-terminated polymers of conjugated dienes and polyepoxy compounds containing at least 3 epoxy groups have been admixed and heated and found to yield, upon heating, compositions exhibiting useful characteristics and possessing properties akin to or the same as those of products ranging from rubbers to rigid plastics, that mixtures of the ingredients of the invention, when larger amounts of epoxy compound per carboxyl group are used, will contain a curing agent for the excess epoxy compound, and, further, that it is within the scope of the invention to include in the overall recipes a crosslinking agent such as an amine, as described.

We claim:

1. A process for the preparation of a novel composition which comprises commingling a liquid carboxy-terminated copolymer of a conjugated diene and a vinyl monomer, and a chain polyepoxide compound having at least three epoxy groups and heating the resulting mixture to form a resilient product, the product containing in the approximate range of 10–300 monomer groups.

2. A process for the preparation of a novel composition which comprises commingling a liquid carboxy-terminated chain polymer of a conjugated diene which can be represented by the general formula

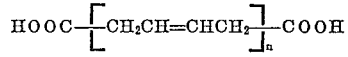

wherein $n$ is in the approximate range 10–300 and a chain polyepoxide compound containing at least 3 epoxy groups and heating the resulting mixture.

3. A process for the production of a moldable composition which comprises admixing a liquid carboxy-terminated chain polybutadiene which can be represented by the general formula

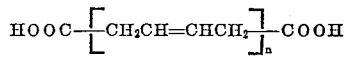

wherein $n$ is in the approximate range 10–300 with a liquid epoxidized chain polybutadiene containing at least three epoxy groups and then heating the mixture thus obtained.

4. A composition obtained by heating a mixture of a liquid carboxy-terminated chain polymer of a conjugated diene which can be represented by the general formula

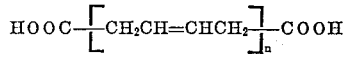

wherein $n$ is in the approximate range 10–300 and a liquid chain polyepoxide compound containing at least 3 epoxy groups.

5. A composition obtained by heating a mixture of a liquid carboxy-terminated chain polybutadiene which can be represented by the general formula

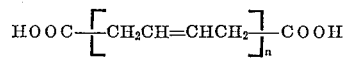

wherein $n$ is in the approximate range 10–300 and a liquid epoxidized chain polybutadiene containing at least three epoxy groups.

6. A method of preparing a moldable composition which comprises admixing a liquid carboxy-terminated chain polymer of a conjugated diene which can be represented by the general formula

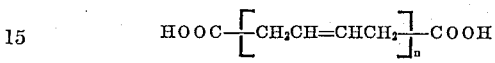

wherein $n$ is in the approximate range 10–300 with a major quantity of an epoxidized chain compound containing at least 3 epoxy groups and a curing agent, other than said diene, for the excess epoxy compound and then heating the mixture thus obtained.

7. A method of producing a composition which comprises admixing a liquid carboxy-terminated chain polymer of a conjugated diene which can be represented by the general formula

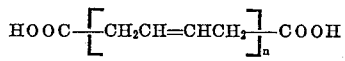

wherein $n$ is in the approximate range 10–300, a liquid chain polyepoxy compound containing at least 3 epoxy groups and a crosslinking agent and heating the mixture thus obtained.

8. A composition according to claim 6.

9. A composition according to claim 7.

References Cited by the Examiner

UNITED STATES PATENTS

| | | | |
|---|---|---|---|
| 2,352,461 | 6/54 | Walker | 260—533 |
| 2,829,130 | 4/58 | Greenspan et al. | 260—78.4 |
| 2,829,135 | 4/58 | Greenspan et al. | 260—78.4 |
| 2,836,586 | 5/58 | Dazzi | 260—94.7 |
| 2,858,323 | 10/58 | Smith | 260—78.4 |
| 2,877,212 | 3/59 | Seligman | 260—533 |
| 2,970,983 | 2/60 | Newey | 260—78.4 |
| 3,097,193 | 7/63 | Gruver | 260—85.1 |
| 3,135,716 | 6/64 | Uraneck et al. | 260—86.1 |

OTHER REFERENCES

Monomer-Polymer Laboratories, Jan. 1, 1958, Borden Chemical Corp.

JOSEPH L. SCHOFER, *Primary Examiner.*

HAROLD N. BURSTEIN, MORRIS LIEBMAN, DONALD E. CZAJA, *Examiners.*